US010062476B2

(12) United States Patent
Varkey et al.

(10) Patent No.: US 10,062,476 B2
(45) Date of Patent: Aug. 28, 2018

(54) HIGH POWER OPTO-ELECTRICAL CABLE WITH MULTIPLE POWER AND TELEMETRY PATHS

(71) Applicant: Schlumberger Technology Corporation, Sugar Land, TX (US)

(72) Inventors: Joseph Varkey, Sugar Land, TX (US); Sheng Chang, Sugar Land, TX (US); Vadim Protasov, Houston, TX (US); Jose Ramon Lozano-Gendreau, Stafford, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 14/408,022

(22) PCT Filed: Jun. 6, 2013

(86) PCT No.: PCT/US2013/044545
§ 371 (c)(1),
(2) Date: Dec. 15, 2014

(87) PCT Pub. No.: WO2014/004026
PCT Pub. Date: Jan. 3, 2014

(65) Prior Publication Data
US 2015/0170799 A1 Jun. 18, 2015

Related U.S. Application Data

(60) Provisional application No. 61/665,531, filed on Jun. 28, 2012.

(51) Int. Cl.
G02B 6/44 (2006.01)
H01B 9/00 (2006.01)
(Continued)

(52) U.S. Cl.
CPC .......... H01B 9/005 (2013.01); G02B 6/4416 (2013.01); G02B 6/4479 (2013.01); H01B 3/30 (2013.01);
(Continued)

(58) Field of Classification Search
CPC .............................. G02B 6/4417; H01B 9/005
See application file for complete search history.

(56) References Cited

U.S. PATENT DOCUMENTS 1,921,606 A 8/1933 Cremer
1,937,054 A 11/1933 Cremer
(Continued)

FOREIGN PATENT DOCUMENTS

CN 202196616 U 4/2012
DE 2818656 A1 10/1979
(Continued)

OTHER PUBLICATIONS

International Search Report for International Application No. PCT/US2013/044545 dated Sep. 5, 2013.
(Continued)

Primary Examiner — Rhonda Peace
(74) Attorney, Agent, or Firm — Eileen Pape

(57) ABSTRACT

A high power opto-electrical cable with multiple power and telemetry paths and a method for manufacturing the same includes at least one cable core element and at least one high-power conductor core element incased in a polymer material jacket layer. The cable core element has at least one longitudinally extending optical fiber surrounded by a pair of longitudinally extending arcuate metallic wall sections forming a tube and a polymer material jacket layer surrounding and incasing the wall sections, wherein the optical fiber transmits data and the wall sections transmit at least one of electrical power and data.

10 Claims, 5 Drawing Sheets

US 10,062,476 B2
Page 2

(51) Int. Cl.
    *H01B 3/30*         (2006.01)
    *H01B 7/14*         (2006.01)
    *H01B 13/016*     (2006.01)
    *H01B 13/06*      (2006.01)
    *H01B 13/14*      (2006.01)

(52) U.S. Cl.
    CPC ........... *H01B 7/14* (2013.01); *H01B 13/0165* (2013.01); *H01B 13/067* (2013.01); *H01B 13/14* (2013.01); *Y10T 29/49201* (2015.01)

(56) References Cited

U.S. PATENT DOCUMENTS

| | | | |
|---|---|---|---|
| 1,987,041 A | 1/1935 | Wood | |
| 2,261,742 A | 11/1941 | Matsumoto | |
| 2,604,509 A | 7/1952 | Blanchard | |
| 2,927,954 A | 3/1960 | Ellsworth | |
| 3,115,542 A | 12/1963 | Palandri | |
| 3,217,083 A | 11/1965 | Gore | |
| 3,602,632 A | 8/1971 | Ollis | |
| 3,639,674 A | 2/1972 | Stier | |
| 3,784,732 A | 1/1974 | Whitfill, Jr. | |
| 4,131,757 A | 12/1978 | Felkel | |
| 4,131,758 A | 12/1978 | Felkel | |
| 4,160,872 A | 7/1979 | Lundberg et al. | |
| 4,183,621 A | 1/1980 | Kao et al. | |
| 4,227,770 A | 10/1980 | Gunn | |
| 4,341,440 A * | 7/1982 | Trezeguet | G02B 6/4416 174/109 |
| 4,375,313 A | 3/1983 | Anderson et al. | |
| 4,389,645 A | 6/1983 | Wharton | |
| 4,408,828 A | 10/1983 | Le Noane et al. | |
| 4,440,974 A | 4/1984 | Naudet | |
| 4,491,386 A | 1/1985 | Negishi et al. | |
| 4,504,112 A | 3/1985 | Gould et al. | |
| 4,522,464 A | 6/1985 | Thompson et al. | |
| 4,523,804 A | 6/1985 | Thompson | |
| 4,524,436 A | 6/1985 | Hall et al. | |
| 4,563,757 A | 1/1986 | Decorps et al. | |
| 4,575,831 A | 3/1986 | Decorps et al. | |
| 4,577,925 A * | 3/1986 | Winter | G02B 6/4488 228/148 |
| 4,579,420 A | 4/1986 | Winter et al. | |
| 4,623,218 A | 11/1986 | Laurette et al. | |
| 4,645,298 A | 2/1987 | Gartside, III | |
| 4,648,919 A | 3/1987 | Diaz et al. | |
| 4,654,476 A | 3/1987 | Barnicol-Ottler et al. | |
| 4,657,342 A * | 4/1987 | Bauer | G02B 6/4422 174/115 |
| 4,658,089 A | 4/1987 | Guzy et al. | |
| 4,675,474 A | 6/1987 | Neuroth | |
| 4,678,274 A | 7/1987 | Fuller | |
| 4,690,497 A * | 9/1987 | Occhini | G02B 6/4494 385/107 |
| 4,696,542 A | 9/1987 | Thompson | |
| 4,705,353 A | 11/1987 | Wagoner | |
| 4,878,733 A * | 11/1989 | Winter | G02B 6/4488 385/102 |
| 4,915,490 A | 4/1990 | Ramsay et al. | |
| 4,976,509 A | 12/1990 | Bachmann et al. | |
| 4,979,795 A | 12/1990 | Mascarenhas | |
| 5,086,196 A | 2/1992 | Brookbank et al. | |
| 5,115,485 A | 5/1992 | Gandy | |
| 5,202,944 A | 4/1993 | Riordan | |
| 5,222,178 A | 6/1993 | Betker et al. | |
| 5,275,038 A | 1/1994 | Sizer et al. | |
| 5,283,852 A | 2/1994 | Gibler et al. | |
| 5,329,605 A | 7/1994 | Wargotz | |
| 5,431,759 A | 7/1995 | Neuroth | |
| 5,493,626 A | 2/1996 | Schultz et al. | |
| 5,495,547 A | 2/1996 | Rafie et al. | |
| 5,590,803 A | 1/1997 | Kaempen | |
| 5,673,352 A | 9/1997 | Bauer et al. | |
| 5,761,361 A | 6/1998 | Pfandl et al. | |
| 5,787,217 A | 7/1998 | Traut et al. | |
| 5,982,965 A | 11/1999 | Cheron et al. | |
| 6,009,216 A | 12/1999 | Pruett et al. | |
| 6,030,255 A | 2/2000 | Konishi et al. | |
| 6,060,662 A | 5/2000 | Rafie et al. | |
| 6,192,983 B1 | 2/2001 | Neuroth et al. | |
| 6,195,487 B1 | 2/2001 | Anderson et al. | |
| 6,201,191 B1 | 3/2001 | Yorita et al. | |
| 6,211,467 B1 | 4/2001 | Berelsman et al. | |
| 6,236,789 B1 | 5/2001 | Fitz | |
| 6,255,592 B1 | 7/2001 | Pennington et al. | |
| 6,255,593 B1 | 7/2001 | Reede | |
| 6,260,656 B1 | 7/2001 | Orban et al. | |
| 6,262,009 B1 | 7/2001 | Rogers et al. | |
| 6,278,825 B1 | 8/2001 | Casiraghi et al. | |
| 6,281,489 B1 | 8/2001 | Tubel et al. | |
| 6,287,455 B1 | 9/2001 | Whitmore | |
| 6,297,455 B1 | 10/2001 | Wijnberg et al. | |
| 6,343,173 B2 | 1/2002 | Hordvik et al. | |
| 6,392,151 B1 | 5/2002 | Rafie et al. | |
| 6,400,873 B1 | 6/2002 | Gimblet et al. | |
| 6,403,889 B1 | 6/2002 | Mehan et al. | |
| 6,404,961 B1 | 6/2002 | Bonja et al. | |
| 6,445,859 B1 | 9/2002 | Witt | |
| 6,463,199 B1 | 10/2002 | Quinn et al. | |
| 6,472,614 B1 | 10/2002 | Dupont et al. | |
| 6,496,627 B1 | 12/2002 | Tuminaro | |
| 6,531,694 B2 | 3/2003 | Tubel et al. | |
| 6,555,752 B2 | 4/2003 | Dalrymple et al. | |
| 6,600,108 B1 | 7/2003 | Mydur et al. | |
| 6,621,964 B2 | 9/2003 | Quinn et al. | |
| 6,714,708 B2 | 3/2004 | McAlpine et al. | |
| 6,727,828 B1 | 4/2004 | Malone et al. | |
| 6,779,927 B2 | 8/2004 | Cens et al. | |
| 6,924,436 B2 | 8/2005 | Varkey et al. | |
| 6,960,724 B2 | 11/2005 | Orlet et al. | |
| 6,968,106 B2 | 11/2005 | Chastain et al. | |
| 6,973,246 B2 | 12/2005 | Bocanegra et al. | |
| 6,978,077 B2 | 12/2005 | Park | |
| 7,005,583 B2 | 2/2006 | Varkey et al. | |
| 7,009,113 B2 | 3/2006 | Varkey | |
| 7,119,283 B1 | 10/2006 | Varkey et al. | |
| 7,140,435 B2 | 11/2006 | Defretin et al. | |
| 7,170,007 B2 | 1/2007 | Varkey et al. | |
| 7,179,019 B2 | 2/2007 | Seto et al. | |
| 7,188,406 B2 | 3/2007 | Varkey et al. | |
| 7,208,855 B1 | 4/2007 | Floyd | |
| 7,235,743 B2 | 6/2007 | Varkey | |
| 7,259,331 B2 | 8/2007 | Sridhar et al. | |
| 7,288,721 B2 | 10/2007 | Varkey et al. | |
| 7,294,787 B2 | 11/2007 | Varkey | |
| 7,324,730 B2 * | 1/2008 | Varkey | G02B 6/4416 385/100 |
| 7,326,854 B2 | 2/2008 | Varkey | |
| 7,402,753 B2 | 7/2008 | Varkey et al. | |
| 7,462,781 B2 | 12/2008 | Varkey et al. | |
| 7,465,876 B2 | 12/2008 | Varkey | |
| 7,603,011 B2 * | 10/2009 | Varkey | G02B 6/4486 285/102 |
| 7,860,362 B2 * | 12/2010 | Varkey | G02B 6/443 385/101 |
| 7,912,333 B2 * | 3/2011 | Varkey | G02B 6/4416 385/101 |
| 8,213,756 B2 | 7/2012 | Herbst | |
| 8,861,911 B2 * | 10/2014 | Shin | G02B 6/4416 385/101 |
| 8,870,858 B2 | 10/2014 | Zerfas | |
| 8,929,701 B2 * | 1/2015 | Lowell | G02B 6/4436 385/101 |
| 8,929,702 B2 * | 1/2015 | Varkey | G02B 6/4416 385/100 |
| 9,201,207 B2 * | 12/2015 | Varkey | E21B 47/123 |
| 9,488,793 B2 * | 11/2016 | Register, III | G02B 6/4416 |
| 9,631,224 B2 | 4/2017 | Ohga et al. | |
| 2001/0020675 A1 | 9/2001 | Tubel et al. | |
| 2001/0023614 A1 | 9/2001 | Tubel et al. | |
| 2001/0040041 A1 | 11/2001 | Pennington et al. | |
| 2002/0007948 A1 | 1/2002 | Bayne et al. | |
| 2002/0085819 A1 | 7/2002 | Stottlemyer et al. | |

(56) References Cited

U.S. PATENT DOCUMENTS

| | | |
|---|---|---|
| 2002/0159726 A1 | 10/2002 | Brown et al. |
| 2003/0042019 A1 | 3/2003 | Harkins et al. |
| 2003/0081917 A1 | 5/2003 | Bussear |
| 2003/0099443 A1 | 5/2003 | Karnik et al. |
| 2003/0099446 A1 | 5/2003 | Witt et al. |
| 2003/0165309 A1 | 9/2003 | Moon et al. |
| 2004/0045735 A1 | 3/2004 | Varkey et al. |
| 2004/0091215 A1 | 5/2004 | Barnoski et al. |
| 2004/0109650 A1 | 6/2004 | Kim et al. |
| 2004/0118590 A1 | 6/2004 | Head |
| 2004/0262027 A1 | 12/2004 | Kaczmarski |
| 2005/0117858 A1 | 6/2005 | Lee et al. |
| 2005/0194578 A1 | 9/2005 | Morris |
| 2005/0281517 A1 | 12/2005 | Wessels, Jr. et al. |
| 2006/0045442 A1* | 3/2006 | Varkey ............... G02B 6/4416 385/102 |
| 2006/0182398 A1 | 8/2006 | Dowd et al. |
| 2006/0193572 A1 | 8/2006 | Mjelstad |
| 2006/0280412 A1 | 12/2006 | Varkey |
| 2008/0024297 A1 | 1/2008 | Maki et al. |
| 2008/0031578 A1* | 2/2008 | Varkey ............... E21B 47/123 385/100 |
| 2008/0118209 A1* | 5/2008 | Varkey ............... G02B 6/4486 385/101 |
| 2008/0289851 A1* | 11/2008 | Varkey ............... G02B 6/4416 174/115 |
| 2009/0046983 A1* | 2/2009 | Varkey ............... G02B 6/443 385/113 |
| 2009/0196557 A1* | 8/2009 | Varkey ............... G02B 6/4427 385/101 |
| 2010/0074583 A1* | 3/2010 | Varkey ............... E21B 47/123 385/101 |
| 2010/0116510 A1* | 5/2010 | Varkey ............... E21B 47/123 166/385 |
| 2011/0139447 A1 | 6/2011 | Ramos et al. |
| 2011/0234421 A1 | 9/2011 | Smith |
| 2011/0240312 A1 | 10/2011 | Varkey et al. |
| 2012/0222869 A1 | 9/2012 | Varkey |
| 2013/0084044 A1 | 4/2013 | Ertel et al. |
| 2014/0367121 A1 | 12/2014 | Varkey et al. |
| 2015/0170799 A1* | 6/2015 | Varkey ............... G02B 6/4416 174/70 R |
| 2016/0222736 A1 | 8/2016 | Varkey et al. |

FOREIGN PATENT DOCUMENTS

| | | |
|---|---|---|
| DE | 29816469 | 12/1998 |
| EP | 0203249 A2 | 12/1986 |
| EP | 0342855 A2 | 11/1989 |
| EP | 0405851 A1 | 1/1991 |
| EP | 0853249 A1 | 7/1998 |
| EP | 1004914 A1 | 5/2000 |
| EP | 2520962 A1 | 11/2012 |
| GB | 2177231 A | 1/1987 |
| GB | 2275953 A | 9/1994 |
| GB | 2444362 A | 6/2008 |
| JP | 547186 A | 1/1979 |
| JP | 6029715 A | 2/1985 |
| JP | S6029715 A | 2/1985 |
| JP | 61013208 A | 1/1986 |
| JP | 2216710 A | 8/1990 |
| JP | H03145014 A | 6/1991 |
| JP | 492110 A | 3/1992 |
| NL | 1019447 C2 | 9/1996 |
| RU | 2066871 C1 | 9/1996 |
| WO | WO9641066 A1 | 12/1996 |
| WO | WO9948111 A1 | 9/1999 |
| WO | WO0005612 A1 | 2/2000 |
| WO | WO2006131871 A2 | 12/2006 |
| WO | WO2006135513 A1 | 12/2006 |
| WO | WO2007066146 A2 | 6/2007 |
| WO | WO2012012679 A2 | 1/2012 |
| WO | WO2012015868 A2 | 2/2012 |
| WO | 2014004026 A1 | 1/2014 |
| WO | WO2016122446 A1 | 8/2016 |

OTHER PUBLICATIONS

International Preliminary Report on Patentability issued in the related PCT Application PCT/US2013/044545, dated Dec. 31, 2014 (4 pages).
Office action issued in the related MX application MX/a/2014/016011, dated Sep. 22, 2016 (7 pages).
Office action issued in the related MX application MX/a/2014/016011, dated Feb. 10, 2017 (8 pages).
International Search Report and Written Opinion issued in the related PCT Application PCT/US2012/060608, dated Jan. 24, 2013 (9 pages).
International Preliminary Report on Patentability issued in the related PCT Application PCT/US2012/060608, dated Apr. 22, 2014 (5 pages).
European Search Report issued in the related EP Application 12841787.0, dated Jan. 19, 2016 (4 pages).
Office action issued in the related EP Application 12841787.0, dated May 9, 2016 (6 pages).
International Search Report and Written Opinion issued in the related PCT Application PCT/US2015/012918, dated Sep. 11, 2015 (17 pages).
International Preliminary Report on Patentability issued in the related PCT Application PCT/US2015/012918, dated Aug. 1, 2017 (13 pages).
International Search Report and Written Opinion issued in the related PCT Application PCT/IB2005/051607, dated Aug. 4, 2005 (8 pages).
International Preliminary Report on Patentability issued in the related PCT Application PCT/IB2005/051607, dated Nov. 21, 2006 (6 pages).
International Search Report and Written Opinion issued in the related PCT Application PCT/IB2008/051589, dated Jan. 14, 2009 (14 pages).
International Preliminary Report on Patentability issued in the related PCT Application PCT/IB2008/051589, dated Nov. 24, 2009 (10 pages).
Second Office Action issued in the related CN Application 200810085459.0, dated Mar. 20, 2012 (4 pages).
Third Office Action issued in the related CN Application 200810085459.0, dated Dec. 7, 2012 (6 pages).
Fourth Office Action issued in the related CN Application 200810085459.0, dated Jul. 1, 2013 (6 pages).
Fifth Office Action issued in the related CN Application 200810085459.0, dated Dec. 25, 2013 (6 pages).
Rejection Decision issued in the related CN Application 200810085459.0, dated Apr. 15, 2014 (6 pages).
First Office Action issued in the related CN Application 200810085459.0, dated Jan. 13, 2017 (4 pages).
Office Action issued in the related CN Application 200810085459.0, dated Jul. 7, 2016 (3 pages).
Lebedev et al., The Breakdown Strenghth of Two-Layer Dielectrics, Tomsk Polytechnic University, Tomsk, Russia #4.304.P2, High VoltageEngineering Symposium, Aug. 22-27, 1999.
Salama et al., Instructional Design of Multi-Layer Insulation of Power Cables, Transactions on Power systems, vol. 7, No. 1, Feb. 1992, pp. 377-382.
Office action issued in the related CA appliation 2594959 dated Feb. 26, 2015 (3 pages).
Office action issued in the related CA appliation 2594959 dated Mar. 1, 2016 (3 pages).
Office action issued in the related FR appliation 2594959 dated Oct. 20, 2011 (2 pages).
Office action issued in the related FR appliation 2594959 dated Dec. 28, 2011 (1 pages).

(56) References Cited

OTHER PUBLICATIONS

Office action issued in the related CA application 2652502, dated Aug. 7, 2015 (3 pages).

* cited by examiner

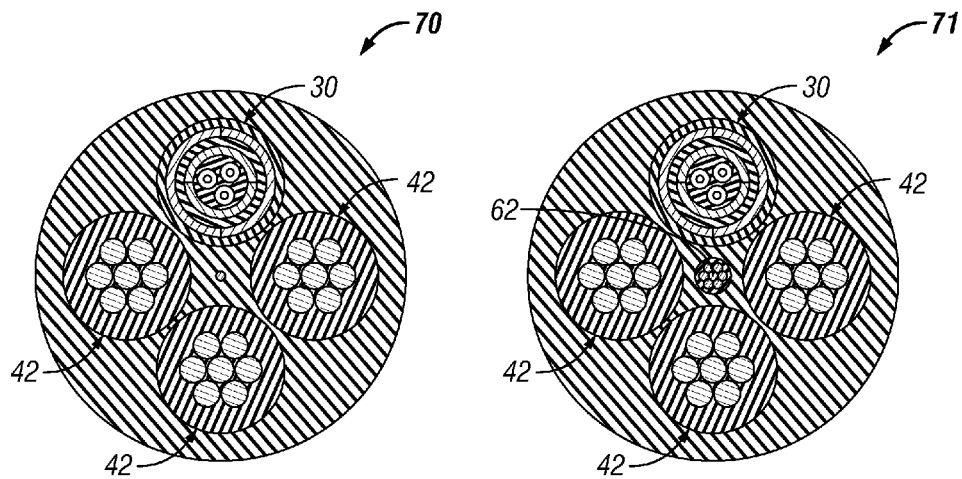
FIG. 7A  FIG. 7B
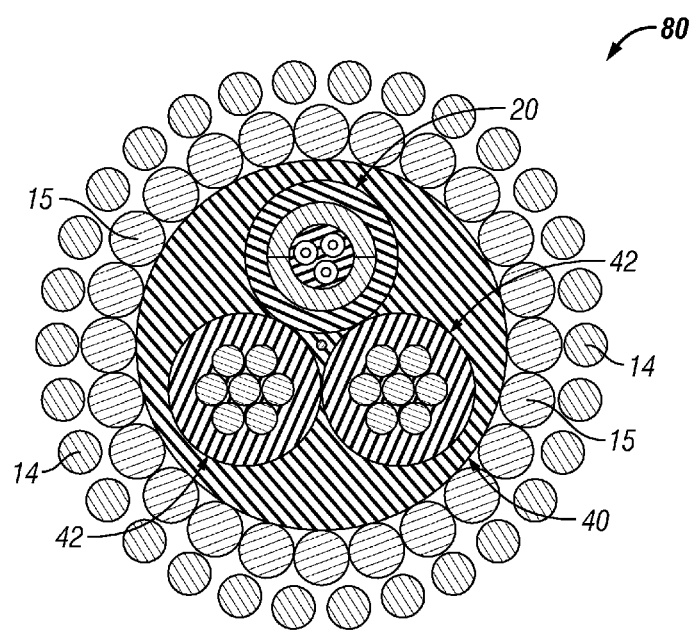
FIG. 8

HIGH POWER OPTO-ELECTRICAL CABLE WITH MULTIPLE POWER AND TELEMETRY PATHS

BACKGROUND

The statements in this section merely provide background information related to the present disclosure and may not constitute prior art.

The present disclosure is related in general to wellsite equipment such as oilfield surface equipment, oilfield cables and the like.

As easily accessible oil reserves become increasingly less common, oil exploration may require drilling to greater depths. Concurrently, more complex, versatile downhole tools have greater requirements for electrical power and/or telemetry. Wireline cables containing only copper conductors are unable to adequately meet today's requirements for both power and telemetry.

Optical fibers, while occupying much smaller space, can provide much lower telemetry attenuation compared to copper conductors. Utilization of optical fibers frees up the cable core real estate and thereby makes it possible to integrate larger conductors for power transmission. Therefore, replacing a copper conductor with an optical fiber in order to increase telemetry capability will provide viable solutions to both telemetry and power problems.

It remains desirable to provide improvements in wireline cables.

SUMMARY

In the embodiments described below, a cable core element has optical fibers for transmitting data and a surrounding metallic tube for transmitting electrical power and/or data. The tube is covered in a layer of polymer material insulation.

The optical fibers are packaged in copper tube shields, which shields can be comprised of two or more arcuate copper wall sections. Micro-bundled fibers can be used to increase the number of fibers in the copper shields. Bundled fibers can include single mode and multi-mode fibers. These fibers can be used for telemetry and/or as sensors to measure distributed temperature, pressure, and longitudinal stain, etc. These fibers are cabled in a helix, increasing the longitudinal strain they can sustain. The copper shields can have one or more layers. Copper shield layers or tubes are separated with insulating polymers. A package with two copper shield layers can operate as a coaxial cable core.

Optical fiber packages with copper conductors are possible in "TRIAD" or "QUAD" designs which are mechanically stable and can transmit high power. The designs contain a high voltage electrical path and a low voltage electrical path. The low voltage path has the option to connect ground to either the copper shield tube or the armor wires. The "QUAD" design can also supply AC power to downhole tools. Embodiments in these designs offer at least two power paths as well as copper and fiber optic telemetry paths.

A first embodiment cable core element comprises at least one longitudinally extending optical fiber, a pair of longitudinally extending arcuate metallic wall sections forming a tube surrounding the at least one optical fiber, and a polymer material(s) jacket(s) layer surrounding and incasing the wall sections, wherein the optical fiber is adapted to transmit data and the wall sections are adapted to transmit at least one of electrical power and data. The metallic wall sections can be formed of copper and the optical fibers may comprise uncoated optical fibers.

A second embodiment cable core element includes the first embodiment cable core element described above with another pair of arcuate metallic wall sections surrounding the jacket layer and forming another tube adapted to transmit at least one of electrical power and data. The another metallic wall sections can be formed of copper and be surrounded by another polymer material jacket layer.

A cable core embodiment for transmitting data and electrical power includes at least one of the optical fiber cable core elements, at least one longitudinally extending high-power electrical conductor core element, and a polymer material layer surrounding and incasing the at least one optical fiber cable core element and the at least one electrical conductor core element to form the cable core. The cable can include at least one layer of armor wires surrounding the polymer material layer and may or may not have one outer layer of polymer material surrounding and incasing the at least one layer of armor wires.

A method for manufacturing a cable for transmitting electrical power and data, comprises the steps of: providing at least one longitudinally extending optical fiber; surrounding the at least one optical fiber with a metallic tube; surrounding and incasing the tube with a polymer material jacket layer to form a cable core element wherein the at least one optical fiber is adapted to transmit data and the tube is adapted to transmit at least one of electrical power and data; providing at least one longitudinally extending high-power electrical conductor core element; and forming a cable core by surrounding and encasing the at least one optical fiber cable core element and the at least one electrical conductor core element with an extruded polymer material layer.

The method can include prior to performing the step of forming the cable core, providing a central element in the form of a deformable filler rod or an insulated conductor, helically cabling the at least one optical fiber cable core element and the at least one electrical conductor core element around the central element, extruding a polymer material outer jacket layer over the cable core. The method further can include applying at least one layer of armor wires at a predetermined lay angle over and partially embedded into the outer jacket layer and extruding an outer layer of polymer material over the at least one layer of armor wires.

BRIEF DESCRIPTION OF THE DRAWINGS

These and other features and advantages of the present disclosure will be better understood by reference to the following detailed description when considered in conjunction with the accompanying drawings wherein:

FIGS. 7A and 7B are radial cross-sectional views of a fourth embodiment wireline cable core with and without a center conductor respectively according to the present disclosure;

FIG. 8 is a radial cross-sectional view of the wireline cable core shown in FIG. 5 with an armor wire package according to the present disclosure.

DETAILED DESCRIPTION

The methods described herein are for making and using oilfield cable components with optical fibers packaged in copper shields. However, it should be understood that the methods may equally be applied to other fiber optic components having metallic shields formed of metallic material other than copper, for example, and that methods for making and using such components are also within the scope of the present disclosure.

Figure 1:
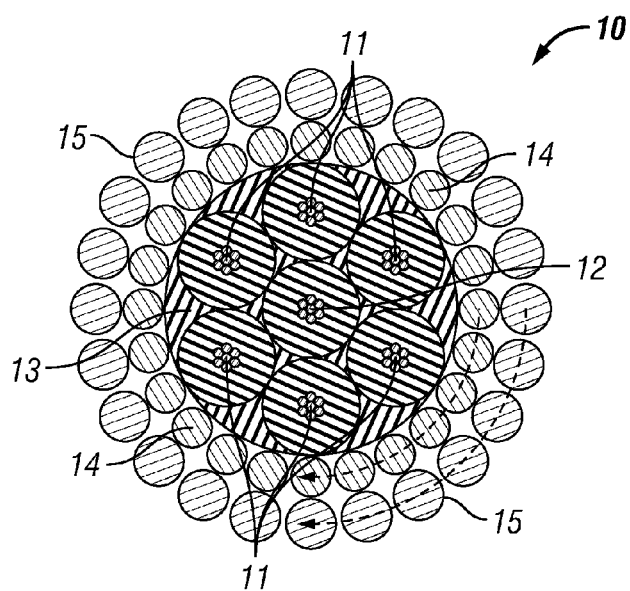
FIG. 1 is a radial cross-sectional view of a typical prior art wireline hepta cable.

The most commonly used prior art hepta cables 10 have seven conductors, with six conductors 11 cabled around a central conductor 12, as shown in FIG. 1. Each of the conductors 11 and 12 is formed with a plurality of metallic wires incased in a polymer material. The conductors 11 are positioned about the central conductor 12 and all of the conductors are incased in a polymer material inner jacket 13. The jacket 13 is surrounded by an inner layer of smaller-diameter armor wires 14 and an outer layer of larger-diameter armor wires 15. The wires 14 and 15 can be incased in a polymer material outer jacket (not shown). Generally, the cable size is restricted due to requirements of surface equipment. The conductor size in hepta cables cannot be increased freely due to the limited real estate available. This situation limits the potential of the prior art hepta cable 10 to provide high-power transmission. Considering the above, typical wireline cables are unable to adequately meet today's ever demanding requirements for power and telemetry.

Figure 2:
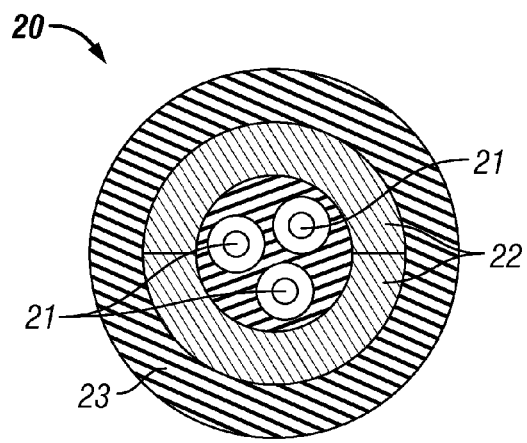
FIG. 2 is a radial cross-sectional view of a first embodiment wireline cable core element according to the present disclosure.

A first embodiment cable core element 20 according to the present disclosure is a one layer copper halves configuration shown in FIG. 2. Longitudinally extending optical fibers 21 are arranged inside two arcuate metallic wall sections 22 that form a longitudinally extending tube shielding the fibers. A polymer material jacket layer 23 is extruded over the wall sections 22 to serve as insulation and protection. Although the wall sections 22 are shown as being abutting semicircular halves, each section could have a different arc and more than two sections could be used to form the tube. In an embodiment, the wall sections 22 are formed of copper.

One feature of this first embodiment is that the optical fibers 21 are packaged loosely into the two copper wall sections 22. Because the optical fibers 21 are protected inside the "tube" formed by the sections 22, the additional expense of carbon coating on the fibers may be avoided and, therefore, the optical fiber or fibers 21 may be uncoated optical fibers 21. The two copper wall sections 22 are protected with the polymeric material jacket 23 which is extruded over the copper walls. The polymeric material jacket 23 also serves as an insulation material which enables the wall sections 22 to transmit electrical power and/or data.

Figure 3:
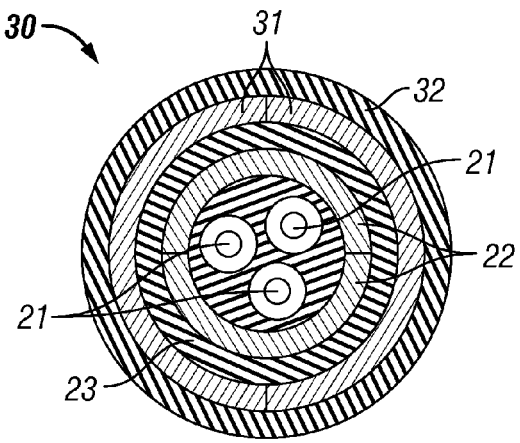
FIG. 3 is a radial cross-sectional view of a second embodiment wireline cable core element according to the present disclosure.

A second embodiment cable core element 30 according to the present disclosure is a two layer copper halves configuration shown in FIG. 3. At the center of the core element 30, there are positioned the optical fibers 21, the wall sections 22, and the jacket layer 23 shown in FIG. 2. The wall sections 22 are first wall sections forming an inner tube and the jacket layer 23 is an inner jacket layer. Another layer of two arcuate metallic second wall sections 31, such as, but not limited to, copper, can be placed over the inner jacket layer 23 surrounding the first wall sections 22 to form an outer tube in a coaxial configuration. An outer jacket layer 32 of polymer material is placed over the outer copper layer or tube of the wall sections 31. The two layers of copper wall sections 22, 31 can be used as a coaxial cable to transfer data and/or they can be used as positive and ground to transfer electrical power.

Figure 4:
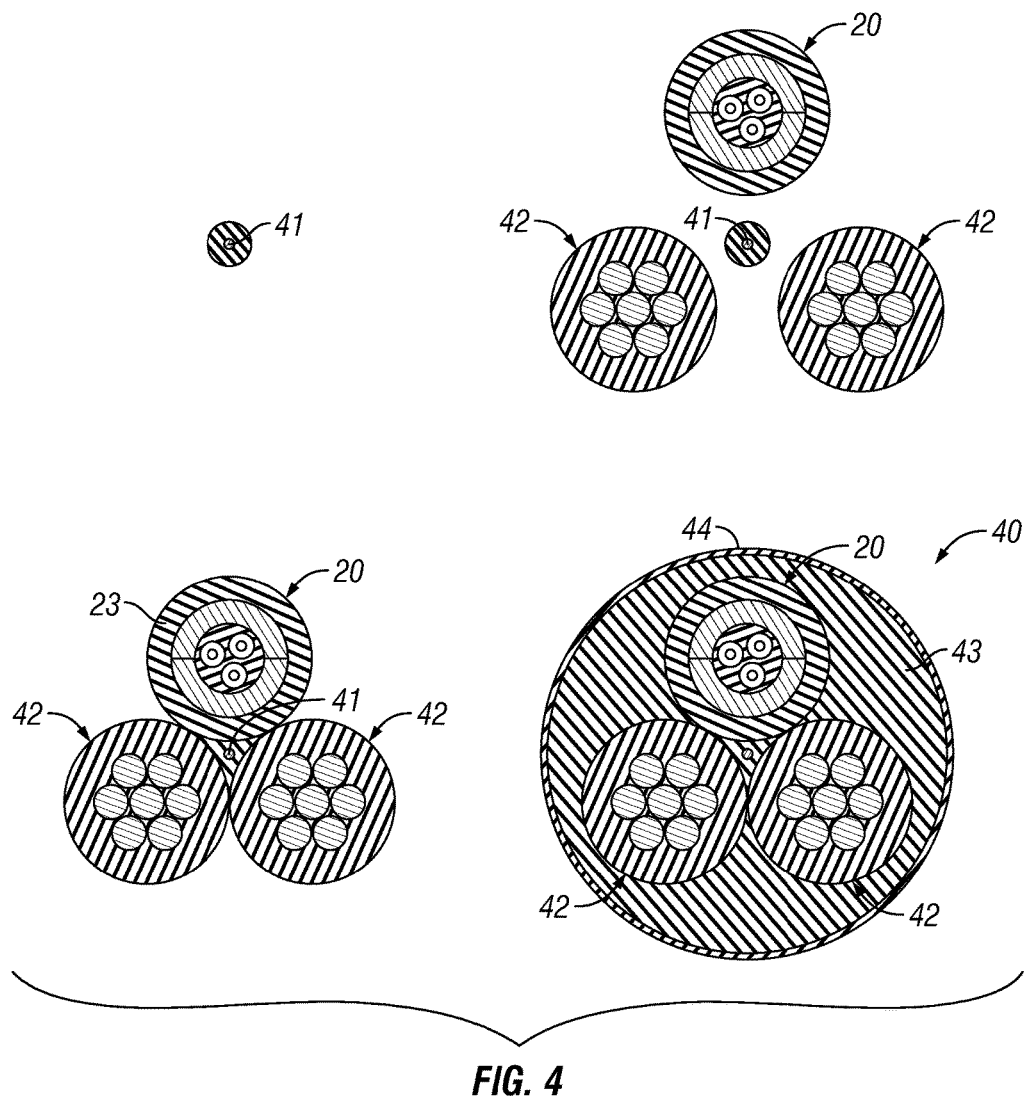
FIG. 4 is a radial cross-sectional view of a first embodiment wireline cable core according to the present disclosure.

A first embodiment cable core 40 comprises a "TRIAD" configuration as shown in FIG. 4. The cable core 40 has three equal-diameter cable core elements cabled around a central element in the form of a deformable polymeric or any other suitable material filler rod 41. One of the cable core elements is the cable core element 20 shown in FIG. 2 wherein the two wall sections 22 are used for electrical high-power transmission. The optical fibers 21 are used for data transmission. The wall sections 22 and armor wires (not shown) could be used for low-power transmission.

As shown in FIG. 4, the cable core 40 is assembled according to the following steps:

1. A deformable polymer material is extruded over a twisted synthetic yarn or a metallic wire to create the deformable central filler rod 41.
2. Two high-power conductor core elements 42, similar in construction to the hepta cable 10 of FIG. 1, and the one copper tube cable core element 20 are cabled helically around the central filler rod 41. The three core elements 20, 42, 42 have the same diameter. As an option, the filler rod 41 could be softened by heating it to facilitate its deformation.
3. As the copper tube core element 20 and the two high-power conductor core elements 42 come together over the filler rod 41, the polymer material of the filler rod deforms to fill the interstitial spaces among the three core elements.
4. Additional soft polymer material is extruded in a layer 43 over the cabled core elements 20, 42, 42 to create a circular profile and allow the core elements to move within this matrix.
5. An additional outer jacket layer 44 of polymer material that has high resistance to deformation is extruded over the layer 43 to take the compression forces exerted by outer armor wires (not shown).

Figure 5:
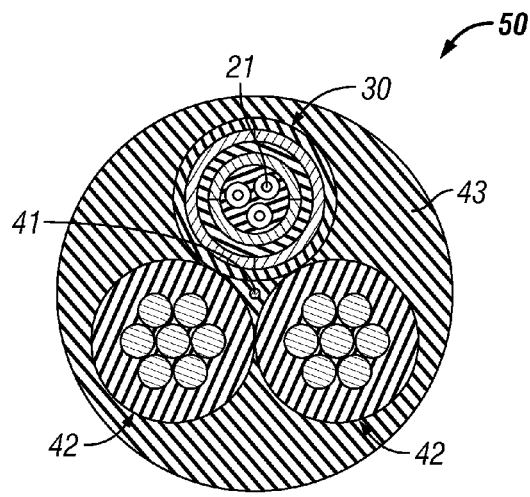
FIG. 5 is a radial cross-sectional view of a second embodiment wireline cable core according to the present disclosure.

A second embodiment cable core 50 also is a "TRIAD" configuration as shown in FIG. 5. The cable core 50 is similar to the cable core 40 shown in FIG. 4, but the cable core element 20 of FIG. 2 is replaced by the dual layer copper tube cable core element 30 of FIG. 3. As in the cable core 40, the two layer tubes cable core element 30 and the high-power conductor core elements 42 are cabled over the deformable central filler rod 41. The two stranded copper conductor core elements 42 are used for high-power electrical transmission. The optical fibers 21 are used for data transmission. The dual layered copper tubes could be used as a coaxial cable for data transmission and/or could be used for low-power electrical transmission. Therefore, there is no need for returning power through outer armor wires (not shown).

Figure 6A:
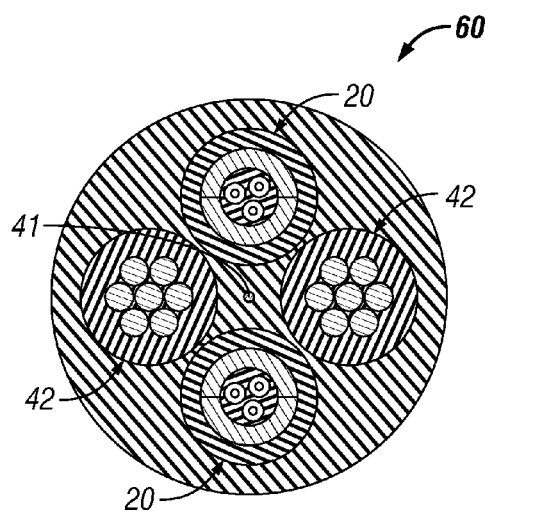
FIGS. 6A and 6B are radial cross-sectional views of a third embodiment wireline cable core with and without a center conductor respectively according to the present disclosure.
Figure 6B:
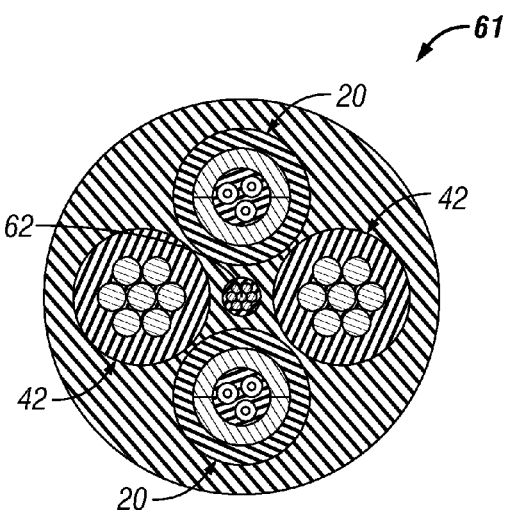

A third embodiment cable core 60 comprises a "QUAD" configuration consisting of four equal-diameter core elements cabled around the deformable polymeric filler rod 41 as shown in FIG. 6A. Two of the stranded copper conductor core elements 42 are used for high-power electrical transmission. Two of the optical fiber cable core elements 20 are used for data transmission. The two copper tubes could be used for data transmission and/or for low-power electrical transmission. Therefore, there is no need for returning power through outer armor wires. As an alternative to the filler rod 41, a similar cable core 61 shown in FIG. 6B has a central element in the form of an insulated copper conductor 62 with a deformable polymeric jacket to provide an extra path for telemetry or power.

A fourth embodiment cable core 70 comprises a "QUAD" configuration consisting of four equal-diameter core elements cabled around the deformable polymeric filler rod 41 as shown in FIG. 7A. Three of the copper conductor core elements 42 are used for AC high-power electrical transmission. The optical fibers of the cable core element 30 are used for data transmission. The two layers of copper tubes could be used as a coaxial cable for data transmission and/or for low-power electrical transmission. Therefore, there is no need for returning power through armor wires. As an alternative to the filler rod 41, the insulated copper conductor 62 with a deformable polymeric jacket can be placed in the center of the cable core 71 shown in FIG. 7B to provide an extra path for telemetry or power.

There is shown in FIG. 8 an armored cable core 80 including the cable core 40 with an armor wire package of strength members applied in two layers. An inner layer comprises a plurality of the larger-diameter armor wires 15. The inner layer is covered by an outer layer of the smaller diameter armor wires 14. The wires 14 and 15 may be standard armor wires cabled over the core 40 at counter-helical lay angles.

Figure 9:
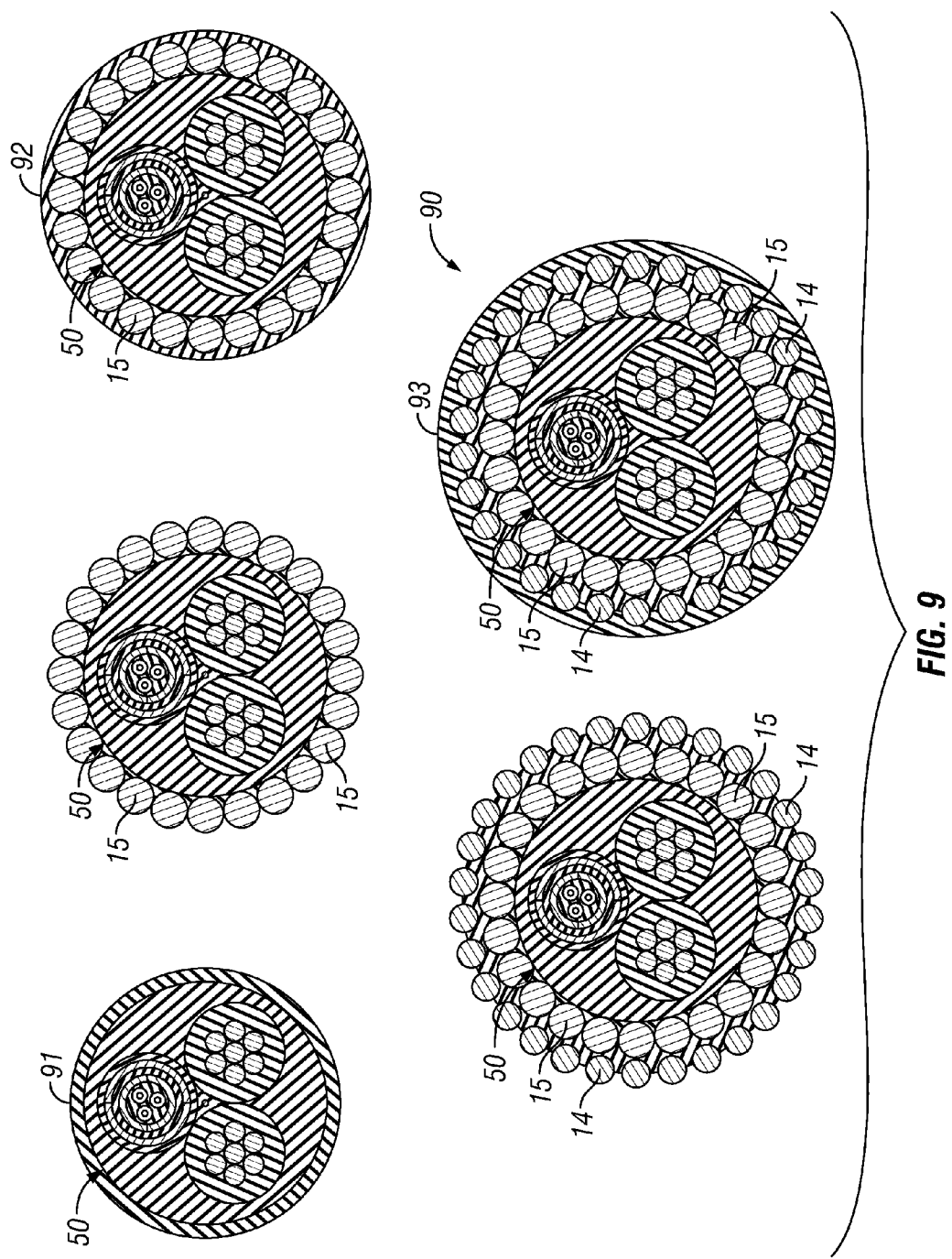
FIG. 9 is a radial cross-sectional view of the wireline cable core shown in FIG. 8 with the armor wires bonded in a polymer material jacket according to the present disclosure.

There is shown in FIG. 9 an armored cable 90 including the cable core 50 with an armor wire package of strength members applied in two layers and incased in a bonded polymer material jacket. The bonded polymer jacket system may be applied according to the following steps:
1. A layer 91 of virgin or short-fiber-reinforced polymer material is applied over the cable core 50.
2. A layer of the larger-diameter armor wires 15 is applied over and partially embedded into the polymer layer 91 at a suitable lay angle.
3. A second layer 92 of virgin or short-fiber-reinforced polymer material is applied over the armor wires 15.
4. A second layer of the smaller-diameter armor wires 14 is applied over and partially embedded into the polymer layer 92 at a counter-helical lay angle to the first armor wire layer.
5. An optional third layer 93 of virgin or reinforced polymer material is extruded over the armor wires 14. Optionally, a final layer (not shown) of virgin polymer material may be extruded over the cable 90 to provide a smoother sealing surface.
6. Each of the layers 92, 92 and 93 may be bonded together from the core 50 of the cable to the outermost jacket layer 93.

The focal point of the embodiments disclosed herein provides optical fibers packaged in copper shields. Together with copper conductors, these embodiments provide the outstanding mechanical stability needed to withstand elevated cable tension and downhole pressure. These embodiments also provide multiple power paths for a downhole tool or tools (attached at an end of the cable and disposed within a wellbore penetrating a subterranean formation) through copper conductors and copper shields. Telemetry may also be run through copper conductors and copper shields to achieve reverse compatibility.

Embodiments of cables disclosed herein may be used with wellbore devices to perform operations in wellbores penetrating geologic formations that may contain gas and oil reservoirs. Embodiments of cables may be used to interconnect well logging tools, such as gamma-ray emitters/receivers, caliper devices, resistivity-measuring devices, seismic devices, neutron emitters/receivers, downhole tractors, mechanical service tools, and the like, to one or more power supplies and data logging equipment outside the well. Embodiments of cables may also be used in seismic operations, including subsea and subterranean seismic operations. The cables may also be useful as permanent monitoring cables for wellbores.

The preceding description has been presented with reference to present embodiments. Persons skilled in the art and technology to which this disclosure pertains will appreciate that alterations and changes in the described structures and methods of operation can be practiced without meaningfully departing from the principle, and scope of the present disclosure. Accordingly, the foregoing description should not be read as pertaining only to the precise structures described and shown in the accompanying drawings, but rather should be read as consistent with and as support for the following claims, which are to have their fullest and fairest scope.

We claim:

1. A method of making a cable, wherein the method comprises:
   providing a cable core, wherein providing a cable core comprises:
   extruding a polymer material about a metallic wire forming a central element;
   cabling two or more high-power conductor core elements and one or more copper tube cable core elements helically around the central element, wherein the central element deforms to fill interstitial spaces between the core elements, forming cabled core elements, wherein the one or more tube cable core elements comprise a first layer of copper halves surrounding at least one optical fiber, an inner jacket, a second pair of copper halves surrounding the inner jacket, and an outer jacket about the second pair of copper halves;
   extruding an additional polymer material about the cabled core elements and forming a circular profile, wherein the at least one optical fiber is packaged loosely into the first layer of copper halves;
   applying a first layer of polymer material about the cable core;
   applying a first layer of armor wires about the first layer of polymer material;
   applying a second layer of polymer material about the first layer of armor wirers;
   applying a second layer of armor wires about the second layer of polymer material; and
   applying an outer layer of fiber reinforced polymer material about the second layer of armor wires.

2. The method of claim 1, wherein the cable core comprises at least one tube cable core element with an optical fiber and at least one stranded copper high-power conductor core element cabled about a central core element that comprises a central core element polymer jacket, and wherein the central core element polymer jacket fills interstitial spaces between the core elements.

3. The method of claim 1, wherein the polymer material about the metallic wire deforms to fill interstitial spaces between the cabled core elements.

4. The method of claim 1, wherein the cable core elements are of equal diameter.

5. The method of claim 1, wherein one of the inner tube or the outer tube is a positive and the other is a negative for power transmission.

6. A cable comprising:
 a cable core wherein the cable core comprises: a polymer material about a metallic wire forming a central element; two or more high-power conductor core elements and one or more copper tube cable core elements helically cabled around the central element forming cabled core elements, wherein the central element deforms to fill interstitial spaces between the core elements, wherein the one or more copper tube cable core elements comprise a first layer of copper halves surrounding at least one optical fiber, an inner jacket, a second pair of copper halves surrounding the inner jacket, and an outer jacket about the second pair of copper halves; an additional polymer material extruded about the cabled core elements, forming a circular profile, wherein the at least one optical fiber is packaged loosely into the first layer of copper halves;
 a first layer of polymer material about the cable core;
 a first layer of armor wires about the first layer of polymer material;
 a second layer of polymer material about the first layer of armor wirers;
 a second layer of armor wires about the second layer of polymer material; and
 an outer layer of fiber reinforced polymer material about the second layer of armor wires.

7. The method of claim 6, wherein the cable core comprises at least one tube cable core element with an optical fiber and at least one stranded copper high-power conductor core element cabled about a central core element that comprises a central core element polymer jacket, and wherein the central core element polymer jacket fills interstitial spaces between the core elements.

8. The method of claim 7, wherein the polymer material about the metallic wire deforms to fill interstitial spaces between the cabled core elements.

9. The method of claim 8, wherein the cable core elements are of equal diameter.

10. The method of claim 7, wherein one of the inner tube or the outer tube is a positive and the other is a negative for power transmission.

* * * * *